United States Patent [19]

Di Giugno

[11] Patent Number: 4,627,026

[45] Date of Patent: Dec. 2, 1986

[54] DIGITAL REAL-TIME SIGNAL PROCESSOR

[75] Inventor: Giuseppe Di Giugno, Bourg la Reine, France

[73] Assignee: I.R.C.A.M. (Institut de Recherche et de Coordination Accoustique/Misique, Paris, France

[21] Appl. No.: 435,698

[22] Filed: Oct. 21, 1982

[51] Int. Cl.[4] .................. G06F 13/00; G06F 15/00
[52] U.S. Cl. ................... 364/900; 364/736
[58] Field of Search ............ 364/724, 726, 728, 736, 364/200 MS File, 900 MS File

[56] References Cited

U.S. PATENT DOCUMENTS

| | | | |
|---|---|---|---|
| 3,812,470 | 4/1974 | Murtha et al. | 364/736 |
| 3,875,391 | 4/1975 | Shapiro et al. | 364/200 |
| 4,090,250 | 5/1978 | Carlson et al. | 364/900 |
| 4,144,582 | 5/1979 | Hyatt | 364/726 |
| 4,146,931 | 3/1979 | Delforge | 364/736 |
| 4,393,468 | 7/1983 | New | 364/726 |

OTHER PUBLICATIONS

Arnold, R. G. et al., The Architecture of the MMBC System, Journal of Digital Systems, vol. V, No. 1/2, 1981, pp. 39-65.
Vick, C. R. et al., Pepe Architecture—Present and Future, Proceedings of the National Computer Conference, Jun. 5-8, 1978, pp. 981-992.

Primary Examiner—Gareth D. Shaw
Assistant Examiner—Kevin A. Kriess
Attorney, Agent, or Firm—Pearne, Gordon, Sessions, McCoy, Granger & Tilberry

[57] ABSTRACT

A digital real-time signal processor is designed to be coupled to a computer. This processor includes a circuit of inputs/outputs, an input/output control circuit, a computer-coupling circuit, a buffer memory, digital signal-processing elements and a control circuit for the processing elements. The digital signal-processing elements are made up of a plurality of interconnected processing modules. Each module comprises an arithmetic unit, a high-speed multiplier, a shift register, a function memory, an addressable data memory containing all data handled by the processors of various functions, a sequentially operated address memory enabling scanning the data memory, and a microprogram memory. Each microprogram contains instructions capable of controlling the arithmetic unit, the multiplier, the shift register, and the waveform memory depending upon a particular configuration.

1 Claim, 17 Drawing Figures $b_{i+1} = a_i b_i$ $b_{i+1} = a_i + b_i$

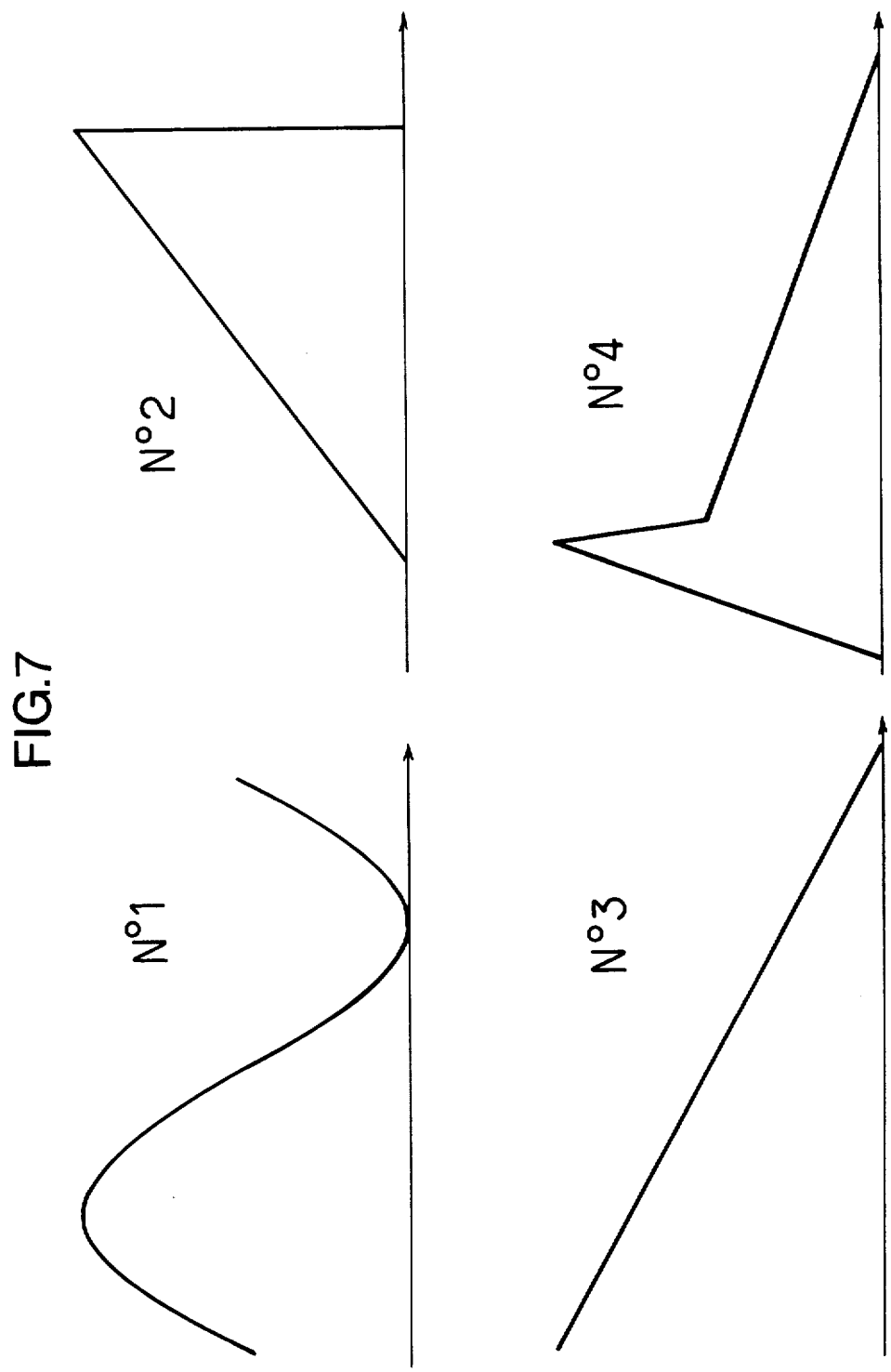

DIGITAL REAL-TIME SIGNAL PROCESSOR

BACKGROUND OF THE INVENTION

The object of this invention is a digital, real-time signal processor. Its applications cover sound-processing, telecommunications, image-processing, optimisation of process control. etc . . . and in general, all techniques related to real-time signal processing.

It is a frequent occurrence, in data-processing systems, to associate a peripheral unit assigned to special processing, thereby offloading the computer of certain tasks and rendering it available for others.

The general organization of such a system is illustrated in FIG. 1. A computer 10 is connected to a mass memory 12 and to interactive units 14. The computer is associated with a peripheral processor 16. This processor comprises, firstly, an input/output circuit 20 with inputs 21, 25 and outputs 23, 26; certain inputs 21 are equipped with a analog-to-digital converter 22, and other inputs, 23, with an analog-to-digital converter 24. These inputs and outputs thus work in analog mode. The other inputs 25 and outputs 26 work in digital mode. The peripheral processor also includes an input-/output control unit 30, a coupling circuit 40 to computer 10, a buffer memory 50, digital processing elements 60 and a circuit 70 controling the processing elements 60. All of these units are interconnected by a bus 80.

In such a system, computer 10 controls the peripheral processor 16. The mass memory 12 stores data addressed to or from the processor.

Externally input signals can be routed through inputs 21, 25. Likewise, signals output through 23, 26 can be applied to external units, not represented, the nature of which depends on the application under way.

Peripheral processors, used up until now, included the means of handling digital processing in which the various elements presented a predetermined configuration as a function of the type of processing required. Even if this solution proves suitable for as long as the processing is always the same, it naturally causes an inconvenience when various types of operations are needed, wherein the operations can change during processing, or from one batch of processing to another.

SUMMARY OF THE INVENTION

The present invention resolves this problem by proposing processing means composed of elements capable of being connected in diverse configurations depending upon the computation to be done. These are controlled by microprograms which are written into a special memory. The invention, thus, reposes essentially on a processor, such as assembly 16 of FIG. 1, and more specifically on the structure and function of elements 60 of the system belonging to this processor.

Precisely, the object of this invention consists of a digital, real-time signal processor designed to be coupled to a computer. As indicated, by referring to FIG. 1, this processor comprises an input/output circuit 20, an input/output control unit 30, a computer-coupling circuit 40, a buffer memory 50, digital signal-processing elements 60, a control circuit 70 for processing elements 60; this processor is characterized in that the digital signal-processing elements 60 are made up of a plurality of interconnected processing modules, each module is comprised of:

an arithmetic unit,
a high-speed multiplier,
a shift register,
a waveform memory,
an addressable data memory containing all data handled by the processor's various functions,
a sequentially operated address memory enabling scanning the data memory,
a microprogram memory, each microprogram containing instructions capable of controlling the arithmetic unit, the multiplier, the shift register and the waveform memory, depending on a particular configuration.

BRIEF DESCRIPTION OF THE DRAWINGS

As will be seen, the characteristics and advantages of this invention will become clearer after reading the following description wherein production examples are cited for illustration only, in no way inferring any limitation of application. The description refers to the appended drawings, in which:

FIG. 7 represents four possible functions which can be obtained with the configuration of the preceding figure.

DETAILED DESCRIPTION OF THE INVENTION

Figure 2:
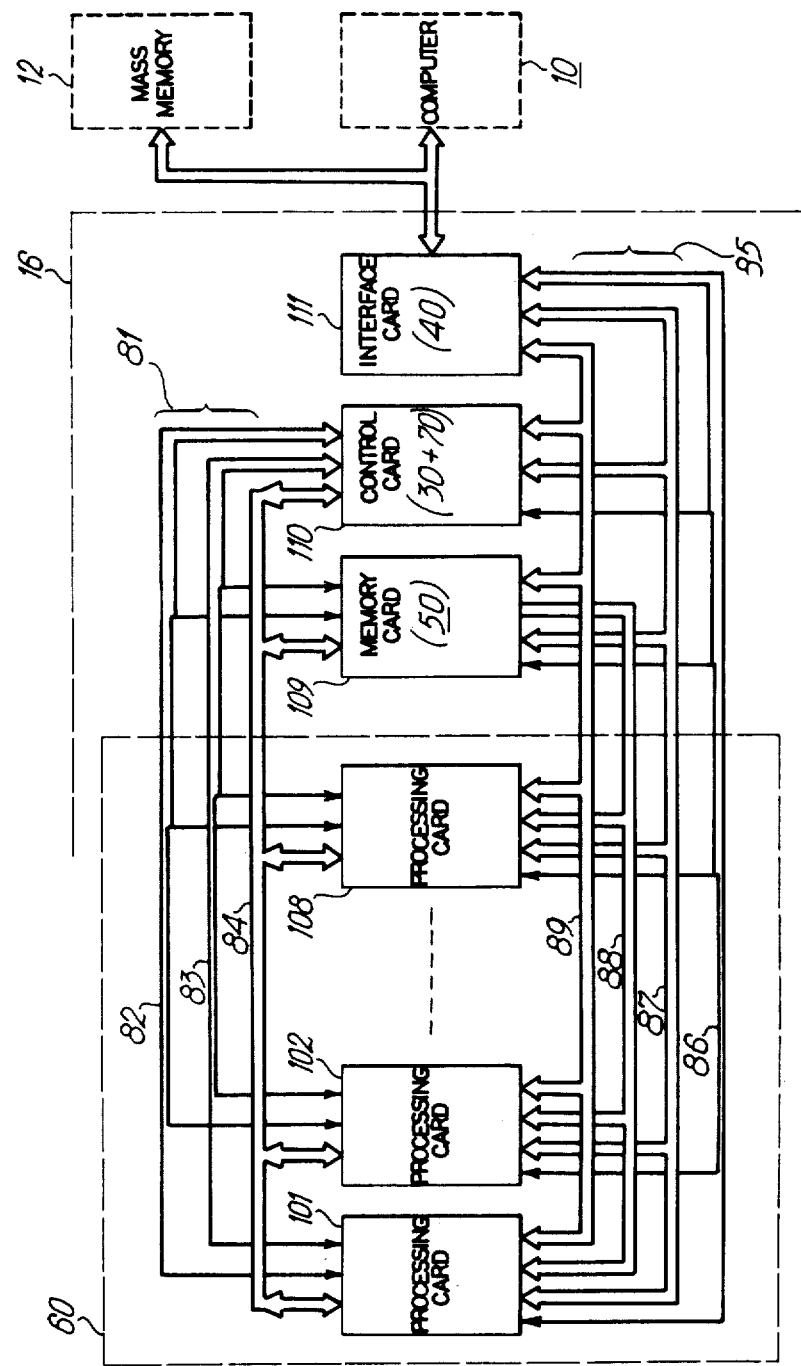
FIG. 2 diagrammatically represents the organization of the cards carrying the processor's circuits, and their connection modes.

Using a known technique, the greater part of the invention's processor circuits are assembled on cards. These cards are grouped in a standard pull-out module stacked in a rack. The rack also contains a 7.5 V power supply feeding the 5 V regulators mouned on each card. FIG. 2 represents the organizational block diagram of the processor's circuits and details the connections between these circuits.

As shown, the processor comprises eight identical processingg cards, reference numbered from 101 to 108; the assembly forms a processing unit 60. Buffer memory 50 is installed on a ninth card 109. The input/output control unit 30 and the control circuit 70 are grouped on an extra card 110. Finally, the computer coupling circuit 40 is arranged on the eleventh card 111.

Processing cards 101 to 108, as well as cards 109 and 110 are tied by an interconnecting bus 81 consisting of a receive bus 82, a transmit bus 83 and a data bus 84. In addition, all the cards are tied by a system bus 85 (S bus) consisting of a select bus 86, an address bus 87, a waveform address bus 88 and a data bus 89.

Communication between the computer and the different cards, via coupling card 40, operates as follows: hierarchical addressing enables selecting:

one card among 10 (from 101 to 110) by decoding, via select bus 86, one memory in the card selected, other than the waveform memory, by the high part of address bus 87, one position in the selected memory, by the low part of the address bus 87.

The data are conveyed by the bidirectional data bus 89.

The processing card wave-form memories are addressed by address bus 88 generated by special logic embedded in card 50.

Intercard communication is controled by:

the transmit bus 83, which selects the transmit card, the receive bus 82 which selects the receive card(s), the data bus 84 conveying the data.

Before describing processing cards 101 to 108 in greater detail, a few indications will be given concerning the structure of their associated cards 109 to 111.

Card 109, first of all, contains a non-volatile read/-write memory with a capacity of 16K words of 16 bits (K=1024), providing the link between the processor and the devices tied into system bus 85 (magnetic tape, disk, etc.).

The purpose of this buffer memory is to store two types of information; data and, exceptionally, instructions:

the data consist of either information generated by the processor, which must be stored for subsequent use, or information intended for the processor, to be used for further processing;

the instructions are programming elements for creating various functional structures of the cards; these normally transit directly from the computer 10 to the memory concerned, via bus 85, thereby permitting the creation and use of a functional structures library.

An example gleaned from the field of electro-acoustics can be cited: after having obtained an orchestral configuration, the program defining this configuration can be stored for reuse. Additionally, the music produced can also be stored in the form of data. Thus, a pre-recorded musical work can serve as a data base for subsequent processing.

As concerns card 110, it comprises:

clock circuits for the generation of interrupt signals, an arbiter logic of interconnection bus 81 and its associated signal memory; the entire circuit forms the control circuit 70, the input/output control unit, providing an external connection from the processor.

The clock circuits consists of programmable counters determining time intervals, at the end of which a request for computer operation (interrupt) causes the current task to be suspended in order to modify the processing elements running in the processor.

For example, in the field of electro-acoustics, the main application for clock circuits are—generation of envelopes for the modification of oscillator amplitudes and frequencies, the changing of filter cutoff frequencies, etc.

The arbiter logic enables data transfer between one card and others among the eight processing cards, the memory card 50 and card 110 itself, all of this via interconnection bus 81. The interconnections to be set up are specified by the content of a 512-word, 14-bit memory preloaded by the computer.

Figure 1:
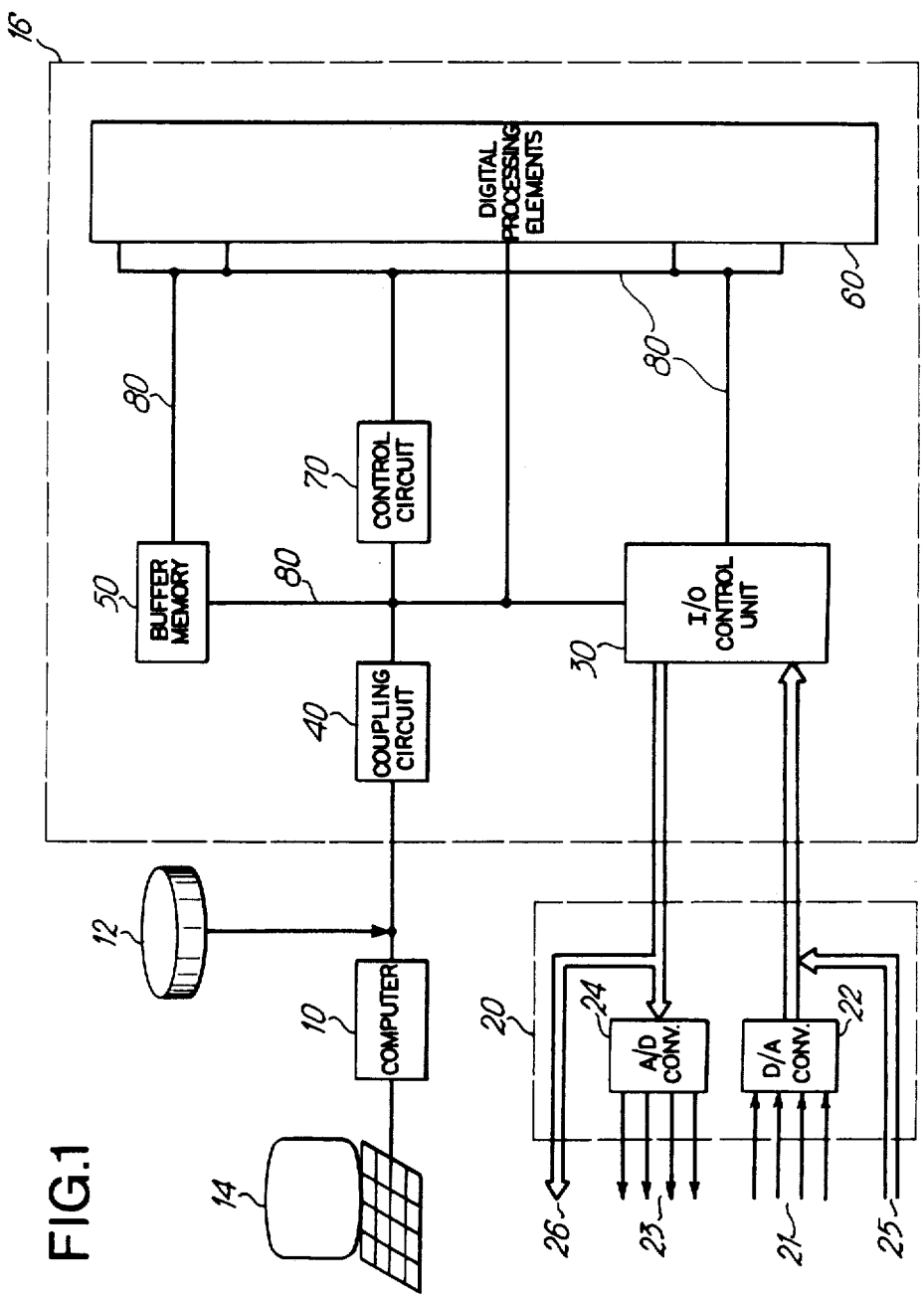
FIG. 1 represents a block diagram of the system already described.

The input/output control unit manages external communication in either digital format (inputs 25, outputs 26 of FIG. 1), or in analog format (inputs 21, outputs 23). In this case the unit controls the analog/digital and the digital/analog converters located externally.

As far as concerns interface card 40, it ensures a classic coupling between the processor and the selected computer. One part of the card is a fixed circuit forming the system bus 85, whereas the other part is dedicated to the selected computer and, thus, modified to match it.

The processing cards will be described next.

Each card communicates with the computer, through card 40, via the system bus 85; this data transfer is either direct or through a buffer memory. This card can also exchange processed data with other cards via the interconnection bus 81.

Figure 3:
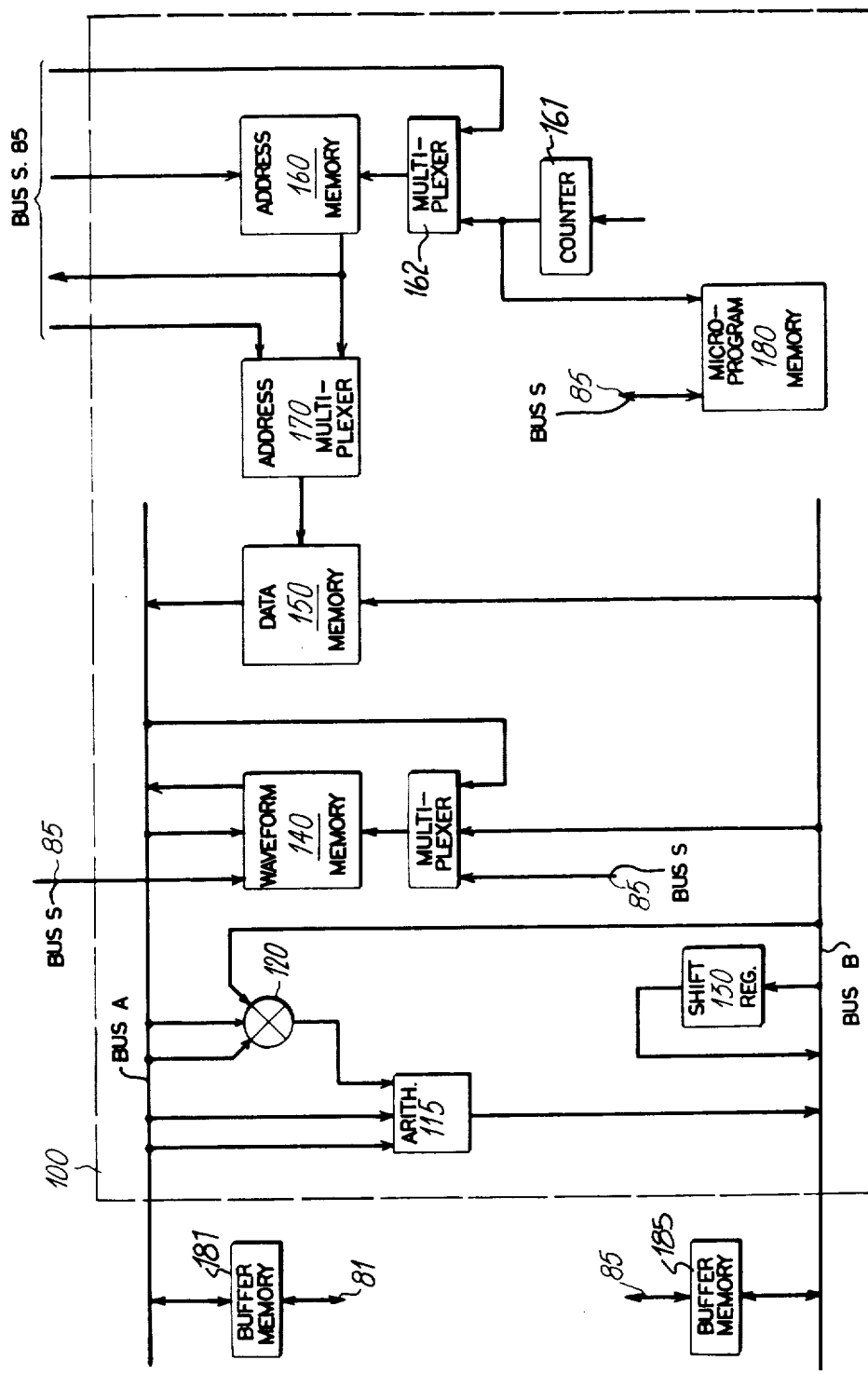
FIG. 3 represents a block digram of one of the modules in conformance with the invention.

The functional structure of the processing card is illustrated by FIG. 3. The functional elements intercommunicate through bus A and bus B depending on what is termed a "pipe-line" structure. This structure enables an increased rate of processing. It consists in a series of sections, each accomplishing a portion of the processing, with the data flowing in the sections, much the same as a fluid in a pipeline.

The functional elements constituting the card include:

(a) an arithmetic card 115 which can perform, on X and Y numbers, arithmetic operations such as $X+Y$, $X-Y$, $Y-X$ for example, on 24 bits;

(b) a high-speed multiplier 120 performing an $X \times Y$ operation on 16 bits of input, with 24 bits of output;

(c) a shift register 130 connected to arithmetic unit 115 and multiplier 120;

(d) waveform memory 140 of, for example, 64K of 16-bit words containing samplings of waveforms which are desired to be created. This memory can be divided into a maximum of 64, 1K-word blocks, which allows for handling 64 different waveforms;

(e) a data memory 150, for example of 512 24-bit words, containing the data processed by unit 115, the multiplier 120 and also containing addresses for the function memory 140; the computer, as well as the other cards of the processor can access this memory;

(f) an address memory 160, for example of 1024 9-bit words, enabling sequential scanning of data memory 150 while the microprogram is running; this scanning is controled by a counter 161 connected to a multiplexer 162; in addition, address memory 160 is connected to data memory 150 by an address multiplexer 170;

(g) a microprogram memory 180, for example of 512 32-bit words containing up to 16 operational configurations for the card; each configuration, consisting of 32 32-bit words, allows interconnection of various elements of the card and forms the executed microprogram (a microprogram is the continuation of operations to be effected to execute an instruction);

(h) each card can also include two buffer memories 181, 185 respectively located between bus A and the interconnection bus 81, and between bus B and the system bus 85.

All of these elements, interconnection according to the microprogram in use, can exchange information (data or addresses) with other cards in the system, via interconnection bus 81 or, externally, via the system bus 85.

The above-described elements can be used separately; however, it is by their assembly into fundamental structures, accomplished by microprogramming, that the functional elements of the required processing are formed.

Among a large range of possibilities, FIGS. 4, 5, 6, 8 and 9 represent a few fundamental structures of those most often used in signal processing. Each of these structures enable several types of processing to be implemented.

Figure 4:
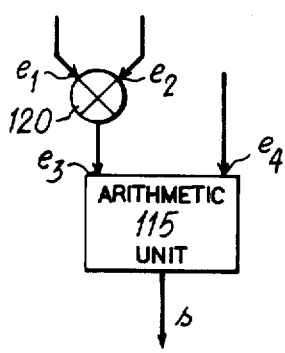
FIG. 4 shows an example of a configuration possible with one of the invention's modules.

The structure of FIG. 4 shows, firstly, a multiplier 120 with dual inputs $e_1$ and $e_2$, an arithmetic unit 115 of which one input $e_3$ is connected to multiplier 120, and another input is noted $e_4$. This unit delivers a signal over one output s.

Depending on the signals applied to inputs $e_1$, $e_2$ and $e_4$, different functions are obtained as shown, non limitedly, by the diagrams of FIGS. 5a, 5b, 5c and 5d.

Figure 5A:
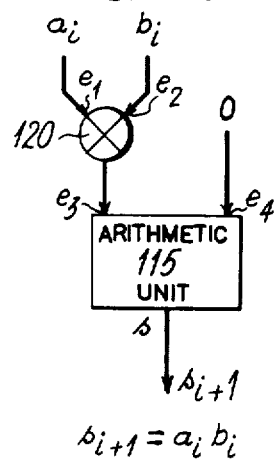
FIGS. 5a, 5b, 5c and 5d illustrate four types of processing obtainable with the configuration of FIG. 3.

As per the diagram of FIG. 5a, two numbers, $a_i$ and $b_i$ (i representing a rank in a sequence) are applied to the inputs of multiplier 120, and input $e_4$ of arithmetic unit 115 is set at 0. The output of this unit delivers a number noted $s_{i+1}$ equal to the product of $a_i$ by $b_i$:

$$s_{i+1} = a_i b_i$$

Figure 5B:
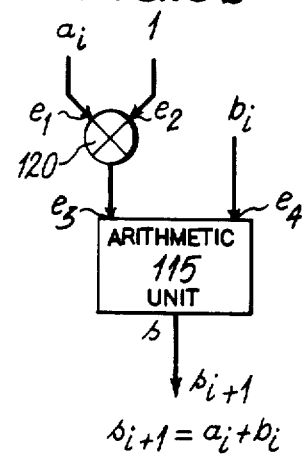

As per the diagram of FIG. 5b, input $e_1$ receives a number $a_i$, input $e_2$ a unit 1 signal, and input $e_4$ a number $b_1$. Output s then delivers a summed signal:

$$s_{i+1} = a_i + b_i$$

Figure 5C:
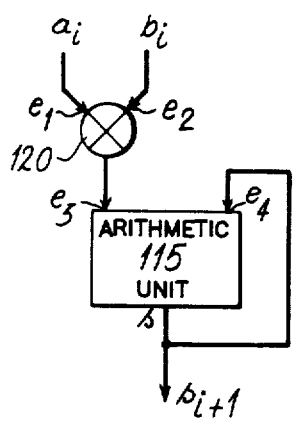

As per the diagram of FIG. 5c, inputs $e_1$ and $e_2$ receive numbers $a_i$ and $b_i$, and input $e_4$ is connected to output s. A signal is then obtained from output $s_{i+1}$ in the form of $$s_{i+1} = a_i b_i + s_i$$

which enables computation of expressions such as:

$$a_0 b_0 + a_1 b_1 + a_2 b_2 + \ldots$$

Figure 5D:
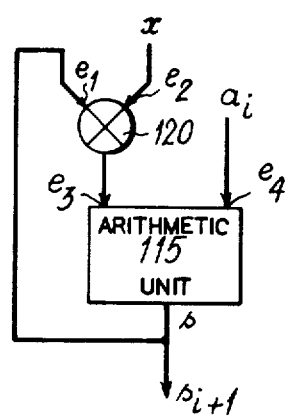

Finally, as per the diagram of FIG. 5d, input $e_1$ is looped back to output s, input $e_2$ receives a signal x, and input $e_4$ a signal $a_i$. The input signal is in the form:

$$s_{i+1} = s_i x + a_i$$

allowing computation of polynomials by the recursive formula:

$$s_{i+1} = (s_{i-1} x + a_{i-1}) x + a_i$$

Figure 6:
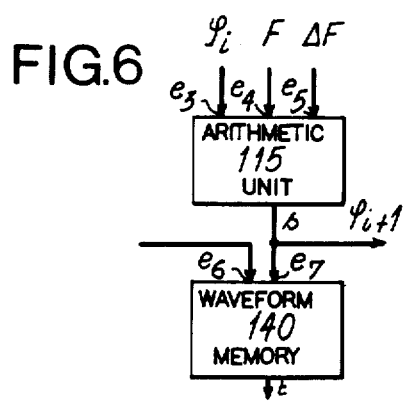
FIG. 6 shows an example of another configuration which can be produced with one of the invention's modules; this configuration corresponds to a wave-form generator.

FIG. 6 illustrates a configuration calling on the arithmetic unit 115 to work with three inputs $e_3$, $e_4$, $e_5$ and the wave-form memory 140. This memory contains samplings of functions to be reproduced. It comprises a select input $e_6$ and a second input $e_7$ corresponding to an address. This input is connected to output s of unit 115. On the other hand, memory 140 features an output t.

A particular waveform is obtained by, firstly, selecting an appropriate signal on input $e_6$ and, secondly, by sequentially scanning the memory in order to place the continuation of corresponding samplings on output t. Scanning the memory is accomplished by addressing the memory with an address which is continuously incremented, so that samples stored in the memory are read one after the other and placed on output t. FIG. 7 represents four possible functions. The scanning speed determines the time occurrence of the waveform. Thus, a simple incrementation of the address of memory 140 will show, in the case of the No. 1 waveform, a sine wave whose frequency is linked to the increment (the greater the increment, the higher the frequency). A variable increment enables generation of frequency modulation.

Through the inputs of unit 115, we can apply the initial phase $\phi_i$ (input $e_3$), frequency F (input $e_4$), the frequency pitch $\Delta F$ (input $e_5$) and the frequency modulation parameters. In this case, output s delivering $\phi_{i+1}$ is relooped to input $e_3$.

Figure 8:
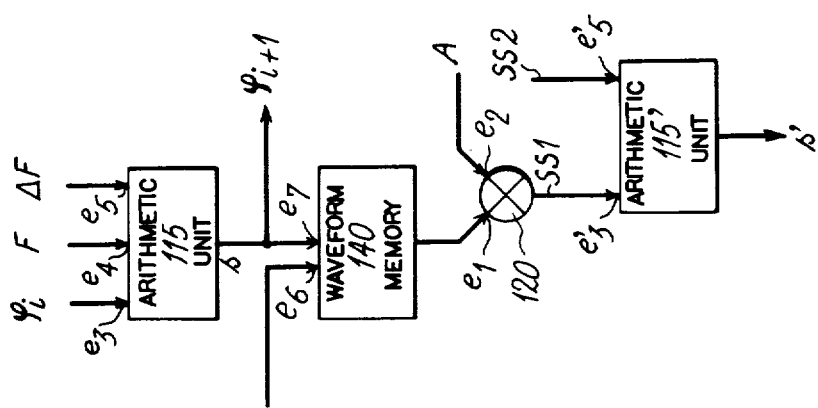
FIG. 8 illustrates another configuration derived from that of FIG. 5, enabling the obtention of amplitude modulation.

The diagram of FIG. 8 corresponds to that of FIG. 6 (arithmetic unit 115 and wave-form memory 140) with, in addition, a multiplier 120 connected to the output of memory 140. Furthermore, this multiplier receives a signal A across its input $e_2$ allowing it to obtain an amplitude modulation. The output signal noted $ss_1$ delivered by multiplier 120 can be mixed with another signal, noted $ss_2$, by a second arithmetic unit 115' receiving both of these signals on its inputs $e'_3$ and $e'_5$.

Figure 9:
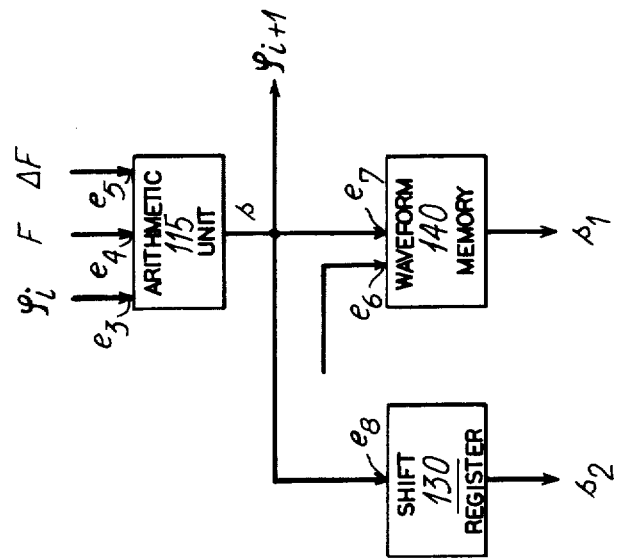
FIG. 9 represents still another configuration bringing a shift register into play.

FIG. 9 represents a variant in which the circuit of FIG. 6 is complemented by the shift register 130 whose input $e_8$ is connected to output s of unit 115. This circuit enables a linear interpolation by using the least significant bits (under the 16th, for example, for 24 bits manipulated during the computation).

Naturally, several functional configurations, such as those which have been described, can be grouped by microprogramming on the same card.

Concerning system sequencing, this is obtained by a clock running at a frequency of 16.384 MHz, depending on the operational mode used by the client. In this case, an elemental instruction cycle, or microcycle, has a duration of 61.035 ns.

During each microcycle, the microprogram memory delivers a microinstruction which establishes the functional configuration corresponding to the action executed during this microcycle. The operands on which the microinstructions work have their addresses in the address memory 160. The 32 microinstructions, corresponding to 32 words of the memory of microprogram 180, form an intermediate cycle with a duration of 1.95 µsec.

Figure 10:
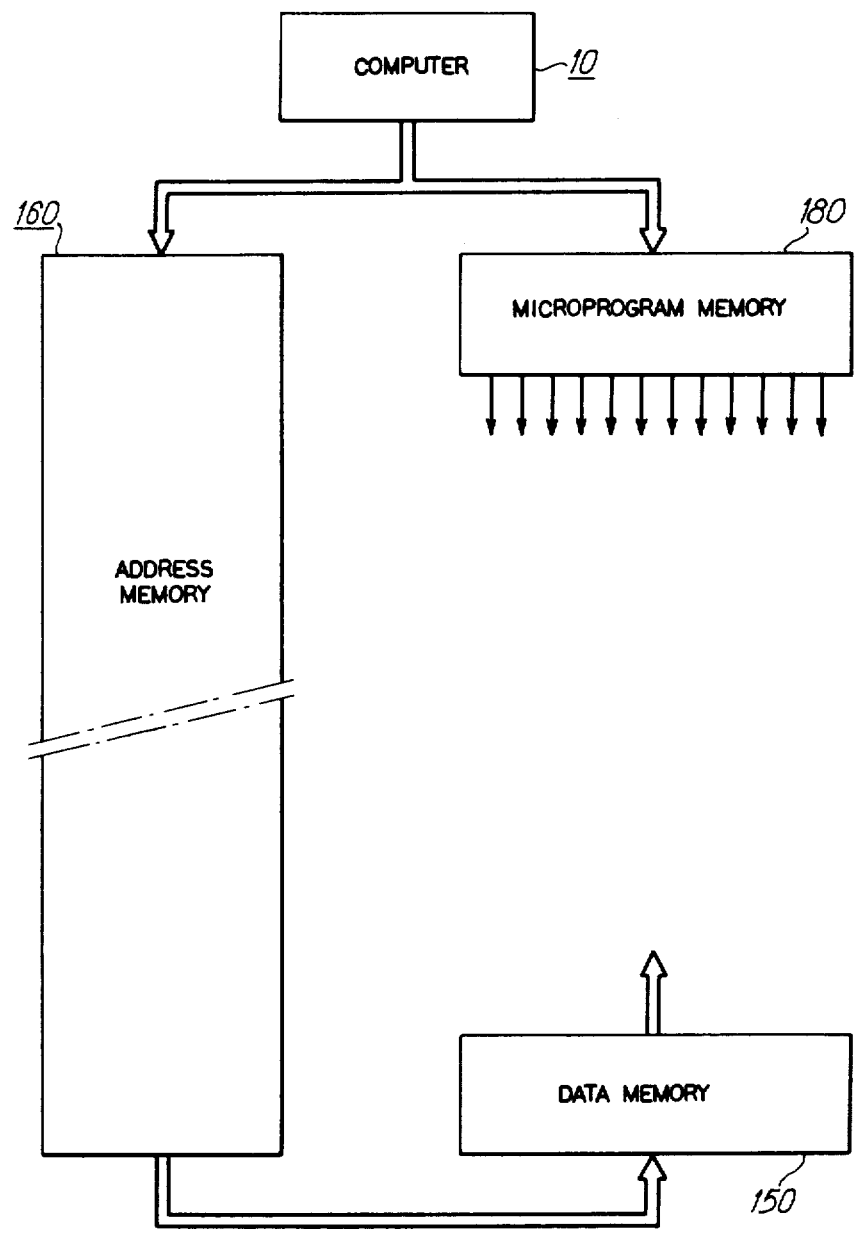
FIG. 10 shows the organization of the address memory.

The microprogram, in a complet cycle having a duration of 62.5 µsec., is executed 32 times with different data, which implies that the size of the address memory is 32×32 words, or 1024 words. The organization of this memory is illustrated in FIG. 10. The 32 blocks of memory 160 are identified respectively: $A_0$ for the one containing the addresses relative to cycle 0, $A_1$ for that containing the addresses relative to cycle 1, etc . . . and $A_{31}$ for the last block.

Figure 11:
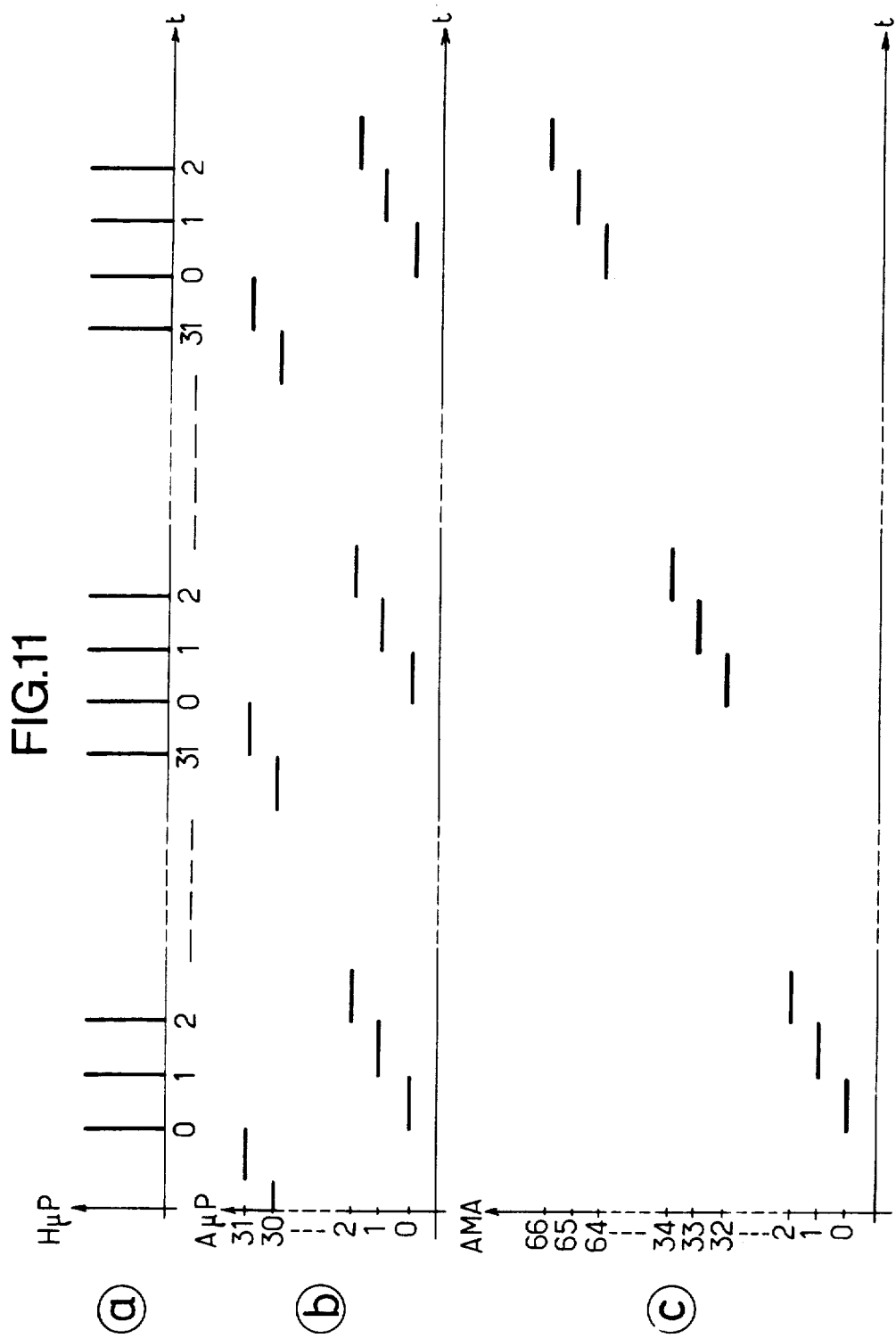
FIG. 11 represents three diagrams illustrating system addressing.

Address scanning is illustrated on FIG. 11, which is comprised of three timing diagrams: the first, a, represents the clock pulses of microprogram HµP, the second, b, the addresses scanned in the memory of microprogrammes 180, or AµP, and the third, c, the addresses in address memory 160, or AMA.

It should be noted that the fundamental structures created during an intermediate cycle are obtained 32 times during a complete cycle.

For example, it is possible to create seven multiplier-/adders of the type in FIG. 4 during an intermediate cycle, or 7×32 =224 multiplier/adders working on distinct data during a complete cycle. In this case, the signal processing sampling period is 62.5 sec., or a sampling frequency of 16000 Hz, which corresponds to a processed-signal passband of 8000 Hz. (Shannon's theory demonstrates that the maximum passband of a sampled signal equals one-half of its sampling frequency).

To process higher passband signals, the microcycle used must be repeated within the complete cycle.

It is thus possible to sample at frequencies of 32 kHz, 64 l kHz, 128 kHz, 256 kHz, 512 kHz, or passbands 16 kHz, 32 kHz, 64 kHz, 128 kHz, 256 kHz. However, the number of fundamental structures created is reduced in the same proportion.

As an application example only, a configuration producing a complex filtering function will be described.

A second order system satisfies the differential equation:

$$S'' + S'(\omega/Q) + S\omega^2 = E\omega^2$$

Figure 12A:
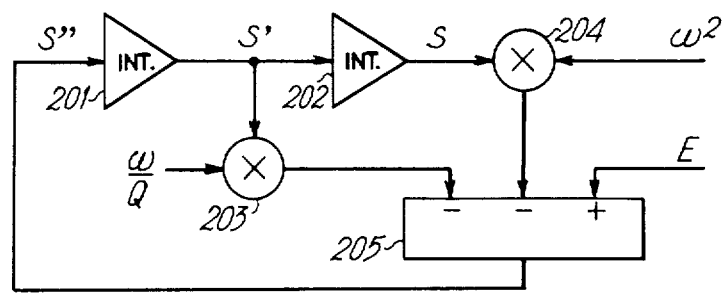
FIGS. 12a, 12b and 12c represent application examples of circuits enabling filter functions.

If E is an input it can be shown that S is an output corresponding to low-pass filtering, $S'\omega/Q$ an output corresponding to passband filtering, and $S''/\omega 2$ an output corresponding to high-pass filtering. The symbol $\omega$ designates a tuning pulse, and Q an overvoltage coefficient. This equation can be resolved from the analog circuit of FIG. 12a. This circuit includes two integers 201 and 202, two multipliers 203 and 204 and a three-input adder-subtracter 205. The input magnitudes are the signals $\omega/Q$, applied to multiplier 203, $\omega^2$ on multiplier 204 and E on a positive input of adder-subtracter 205.

Figure 12B:
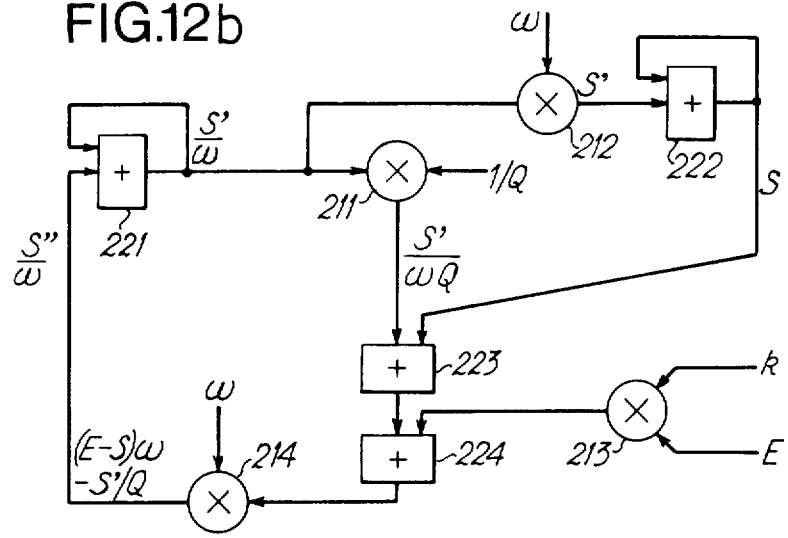
Figure 12C:
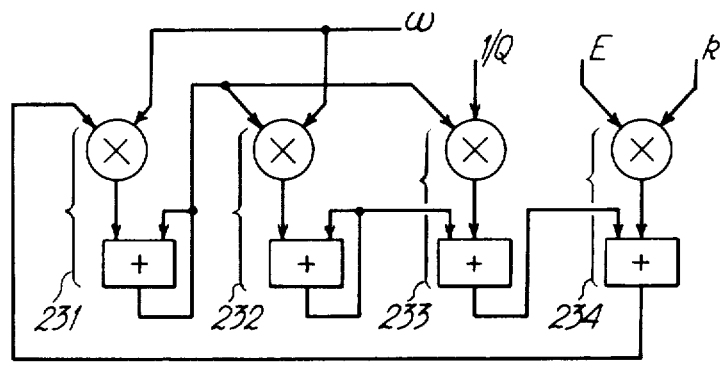

The integrators can be produced digitally by the adder-accumulators through simple feed-back loops, which thus leads to the diagram of FIG. 12b, resolving the equation $$S''/\omega = (E-S)\omega - (S'/Q)$$

more adequately, to supply the three outputs required. The circuit represented includes four multipliers 211, 212, 213 and 214, and four adders 221, 222, 223 and 224. This diagram can be implemented with the functional element of FIG. 4 and leads to the diagram of FIG. 12c which is comprised of four assemblies 231, 232, 233 and 234.

To illustrate the capabilities of the system just described, a few examples of special cards produced will be listed.

EXAMPLE 1

One card assembles the equivalent of 128 independent oscillators with dual frequency inputs. By using eight identical cards, it becomes possible to have 1024 oscillators.

These 128 oscillators are obtained by time multiplexing:
four oscillators are created during an intermediate cycle (running through the complete microprogram),
the succession of 32 intermediate cycles forming the complete cycle lead to a total of 128.

EXAMPLE 2

One card represents the equivalent of 224 multiplier-adders (32 cycles of seven multiplier-adders) producing up to 56 second-order filters.

EXAMPLE 3

One card representing, simultaneously, the equivalent of:
64 multi-input oscillators, enabling to produce up to 32 interpolators or 32 variable delays,
64 linear operators (multiplier-adders) enabling, for instance, to produce 16 second-order universal filters (high-pass, low-pass, passband) or higher-order filters.
32 logic units,
and 32 write oscillators in the function table memory.

EXAMPLE 4

One card containing the circuits capable of implementing fast FOURIER transforms from a signal, according to algorithms of COOLEY and SANDE. The following results were obtained:
with the signal sampled at a 16000 Hz frequency, thus a passband of 8000 Hz, it is possible to process 512 points if the values are real, or 256 in the case of complex values. Thus, the signal can have a duration of:

$$512 \times (10^3/16,000) = 32 \text{ msec.}$$

with an analysis accuracy of 30 Hz.
by sampling the signal at a 512 kHz frequency, therefore at a passband of 256 kHz, and by processing the same number of points, the duration is reduced to 1 msec. with an analysis accuracy of 1000 Hz. Intermediate values are, of course, possible.

This operation takes up approximately one-quarter of the card's capacity, the rest of the card can be used for other operations.

It is possible to use 8 analog cards, thereby enabling the processing of several signals simultaneously and the computation of multidimensional fast FOURIER transforms.

The software associated with the above described system must be watched at several different levels:
the system configuration software: microprogramming and macroprogramming,
the operating software.

For system configuration software, microprogramming is effected at two levels:
the writing of the microprogramming memory determines the fundamental structures such as they are presented on FIGS. 4, 6, 8 and 9. For a given field of application, this leads to the determination, once for all, of a certain number of models which will form the basic elements subsequently used in this type of application;
the writing of the address memory determines the linkup between the model's fundamental structures to implement special processing within the field of application.

Once the models are created, the use of the system consists essentially in producing the interconnections, that is, writing of the address memory. This is why high-level software can be developed to facilitate this task.

Several versions of this software, termed interconnection software, could exist directed to distinctly different users. Certain follow the hardware closely (use of magnitudes in octal, definition of memories used, etc . . . ), others wish to ignore the machine (use of mnemonic variable terms, insertion of frequencies in Hz, etc . . . ).

All of this software is "portable", meaning that it can operate without modification on several different computers. Only a few instructions in assembler need be modified to control the input/output commands.

As for the system operating software, it is defined by this use, depending on the processing to be carried out.

From this description, it can be seen that the processor of the invention features the following characteristics: it is an intelligent and independent peripheral. While it is in operation, the host computer can be used for other tasks such as the control of system operating modes, or any background processing not requiring real-time operation. Real-time processing is handled entirely by the processor.

The basic concept in this system is the apparent multiplication of fundamental structures, through time multiplexing.

The invention's system is capable of digitally processing complex problems in linear and non-linear fields, which makes it a highly indicated tool for digital signal and data processing. The main functions which can be accomplished are:

signal generation for all known methods of synthesis,
reciprocal FOURIER transforms (obtaining a signal from its spectrum),
measuring,
spectral analysis,
determination of transfer functions,
measurement of static properties,
determination of FOURIER transforms (transformation of fast FOURIER),
correlation, convolution, deconvolution,
filtering,
consistent integration,
equalization,
real-time simulation and emulation,
filtering and synthesis by Linear Predictable Coding (LPC).

What is claimed is:

1. A digital real-time signal processor, designed to be coupled to a computer (10), comprising:
a computer coupling circuit (40) connected to said computer (10);
an input-output control circuit (30);
a buffer memory (50); and
a digital processing circuit (60), said input-output control circuit, said buffer memory and said digital processing circuit being interconnected by an interconnection bus (81) and by a system bus (85), said interconnection bus (81) comprising a receive bus (82), a transmit bus (83) and a first data bus (84), said system bus (85) comprising a select bus (86), an address bus (87), a waveform address bus (88) and a second data bus (89), said digital processing circuit (60) comprising a plurality of processing modules (101, 102 . . . 110), each of said modules being controlled by said select bus (86), said transmit bus (83) and said receive bus (82), data being exchanged between modules by said first data bus (84), each of said modules comprising:

(a) a first bus A
(b) a second bus B
(c) an arithmetic circuit (115) with at least a first input connected to said first bus A, a second input and an output connected to said second bus B,
(d) a high-speed multiplier (120) having at least a first input connected to said first bus A and a second input connected to said second bus B and an output connected to said second input of arithmetic circuit (115),
(e) a shift register connected to said second bus B,
(f) a waveform memory (140) containing samplings of determined waveforms, said waveform memory being addressed by said address bus (88), and having an output connected to said first bus A,
(g) a data memory (150) having an input connected to said second bus B and an output connected to said first bus A, and an addressing input,
(h) an address memory (160),
(i) a first address multiplexer (162) having a first input connected to said system bus (85), a second input, and an output connected to said address memory (160),
(j) a counter (161) connected to said second input of said first address multiplexer,
(k) a second address multiplexer (170) having a first input connected to said address bus (87) and a second input connected to said address memory, and an output connected to said addressing input of said data memory (150),
(l) a microprogram memory (180) having an output connected to said system bus (85), said microprogram memory being addressed by said counter (161),
(m) a first buffer memory (181) connected between said first bus A and said interconnection bus (81), and
(n) a second buffer memory (185) connected between said second bus B and said system bus (85).

* * * * *